United States Patent [19]

Czeglédi et al.

[11] 4,366,129

[45] Dec. 28, 1982

[54] PROCESS FOR PRODUCING ALUMINA AND FERRIC OXIDE FROM ALUMINIUM CARRIERS WITH HIGH IRON AND SILICON CONTENT

[75] Inventors: Béla Czeglédi; Mihály Csövári; Miklós Erdélyi; Lajos Streker; István Tóth, all of Pécs; Katalin Szabó née Mogyorósi, Tatabanya; Szilárd Riederauer, Budapest; Géza Szentgyörgyi, Tatabánya, all of Hungary

[73] Assignee: Tatabányai Szénbányák, Tatabánya, Hungary

[21] Appl. No.: 251,997

[22] Filed: Apr. 8, 1981

[51] Int. Cl.³ .............................. C01F 7/22; C01F 7/26
[52] U.S. Cl. ..................................... 423/112; 423/128; 423/132; 423/139
[58] Field of Search ............... 423/112, 132, 128, 139, 423/150

[56] References Cited

U.S. PATENT DOCUMENTS

| | | | |
|---|---|---|---|
| 1,132,537 | 3/1915 | Thompson | 423/132 |
| 2,376,696 | 5/1945 | Hixson et al. | 423/132 |
| 3,079,228 | 2/1963 | Skay | 423/132 |
| 4,239,735 | 12/1980 | Eisele et al. | 423/132 |

FOREIGN PATENT DOCUMENTS 2707 of 1876 United Kingdom ................ 423/132

OTHER PUBLICATIONS

Reents, "Industrial & Engineering Chem.", Jan. 1955, pp. 75–77, vol. 47.

*Primary Examiner*—Herbert T. Carter
*Attorney, Agent, or Firm*—Gabriel P. Katona

[57] ABSTRACT

The invention concerns a process for the preparation of alumina and ferric oxide from low-grade aluminium and iron carriers. The processes, in addition to conventional technological steps, comprises the steps of dissolving the iron content of a ground, mineral material in an aqueous hydrochloric acid solution containing 200 to 420 g./lit. of hydrochloric acid at 90° to 130° C., eliminating the iron from the slurry of from a solution obtained by filtration of the slurry, with an anion exchange resin or semipermeable membrane or cloth, continuously or discontinuously, eluting the iron from the ion exchange resin and recycling hydrochloric acid and sulfuric acid in a closed system.

5 Claims, No Drawings

PROCESS FOR PRODUCING ALUMINA AND FERRIC OXIDE FROM ALUMINIUM CARRIERS WITH HIGH IRON AND SILICON CONTENT

The invention relates to a new process for producing alumina and ferric oxide from aluminium carriers with high iron and silicon content. More particularly, the invention concerns a method for producing alumina and ferric oxide from aluminium carriers, preferably from low-grade bauxite, clays, red mud, etc. in a purity, which makes further manufacturing without additional purification possible.

It is well known that high-quality bauxites required for the Bayer process are only restrictedly available and their supply is decreasing year by year. On the other hand, aluminium- and iron-containing waste matters, e.g. red mud, colliary rocks, coal ash, etc. are produced in an increasing amount. There is, therefore, a high demand for economic methods by which aluminium and/or iron can be recovered from these and other low-grade carriers, e.g. low-grade bauxites, clay minerals and slates.

There are numerous methods known in the art to recover aluminium or iron from low-grade carriers. Generally aluminium is recovered from carriers having small or reduced iron concentration, while for recovering iron, carriers enriched in iron are generally employed. The physical methods used for the separation of different types of raw materials, e.g. washing, flotation, separation by specific gravity, etc. generally cannot produce the required selective separation. This is a difficult problem, since for instance the additional purification of aluminium alloys produced from aluminium carriers with a high iron and silicon concentration is rather complicated and cannot be performed economically. Similarly, the treatment of aluminium carriers with a high silicon content with sulfurous or sulfuric acid is not economic either.

The pyrolytic methods also provide rather poor results, when carried out on low-grade aluminium carriers. It has been attempted to subject aluminium-containing raw materials to chemical deironization by sulfuric acid, hydrochloric acid, ammonium salts thereof or chlorine gas. In this way, however, a substantial amount of alumina is also dissolved, the separation is difficult, and hence high losses in aluminium are resulted.

Since the energy demand of the electrolysis of aluminium chloride is considerably less than that of the electrolysis of alumina, several methods have been developed for the conversion of alumina into aluminium chloride by chlorination and for the production of aluminium from aluminium chloride. Such processes are for example disclosed in the Hungarian patent specifications Nos. 160,229 and 162,348. These methods, however, involve serious problems in the operation, require special equipments and the purity of the aluminium obtained is also not satisfactory.

According to another method disclosed in the Hungarian patent specification No. 150,459 low-grade aluminium carriers are calcined at 650° C., ground and treated with a 20% aqueous hydrochloric acid solution. In this way aluminium, calcium, iron, etc. are dissolved. The solution is then filtered, deironized with a strongly basic ion exchange resin, the aluminium chloride solution is evaporated and iron is eluted from the resin with a slightly acidic aqueous solution. By this method iron and silicon can be separated from aluminium. The method can, however, not be employed for manufacturing bauxites, since under the given conditions aluminium oxides are very poorly soluble, the purity of the obtained alumina is not satisfactory and the problem of the recovery of the mother liquors has not been solved. This process is, therefore, very expensive and the filtration of the solution with concentrated hydrochloric acid requires extreme precautions and is very slow.

It can be established that there is no method known in the art for an economic recovery of alumina and ferric oxide from low-grade aluminium carriers in an appropriate purity.

Hence, the object of the present invention is to provide a process for producing alumina and ferric oxide from low-grade aluminium carriers, which contain iron and silicon in a high concentration in an appropriate purity, by treating the raw materials with hydrochloric acid, separating ferric chloride selectively, sulfatizing, dissolving and filtering the deironized residue, optionally subjecting it to further purification and subjecting the ferric oxide and aluminium sulfate to pyrolytic decomposition. The process is characterized by that the iron-content of the ground mineral raw material is dissolved in hydrochloric acid having a concentration of 200 to 420 g./lit. at 90° to 130° C., and iron is eliminated from the slurry or from a solution obtained by filtration with an anion-selective resin or semipermeable membrane or cloth by a step-by-step or continuous method, it is then eluted from the ion exchange resin, while hydrochloric acid and sulfuric acid are circulated in a closed system.

In the process according to the invention bauxites having a low module and/or containing laterite, siderite and red mud, colliary rocks, coal ash and clays can for example be used as starting materials. Mineral raw materials and hydrochloric acid solution are contacted in a mutual proportion of 1:1 to 1:2. Iron dissolved in the form of ferric chloride is eliminated by strongly basic anion exchange resins, preferably containing trimethyl amine (dimethylethanol amine) or pyridine active groups. The anion exchange resin can be employed also as a membrane or cloth in a batch-type or continuous process. Iron can be absorbed from a filtered solution but satisfactory results are obtained also by leading the slurry containing ferric chloride in counterflow with the eluting aqueous solution, along the ion exchange cloth or membrane. To the deironized residue concentrated sulfuric acid is added in an about stochiometric amount calculated for the soluble oxides, the mixture is heated up to 140° to 160° C. with stirring, and hydrochloric acid set free during sulfatization is recycled into the deironization process as an azeotropic mixture. The excess of sulfuric acid, which is distilled off at 300° to 400° C. during the autothermic reaction is also recycled into the sulfatisation step. The nearly acid-free, heat-treated sulfate mixture, which has lost its crystal water and has been disintegrated into a finely divided, powdery product is dissolved in water and the undissolved, dehydrated silicates and titanates are filtered off, optionally in the presence of flocculating agents. If desired, the filtrate can be subjected to a further deironization, which can be carried out by extraction or ion exchange.

The ferric chloride and aluminium sulfate solutions obtained during the procedure are evaporated, whereupon they are subjected to thermal decomposition at about 850° C. The hydrochloric acid and sulfur trioxide formed are recycled into the corresponding, earlier stages of the process and, apart from minor losses, hydrochloric acid and sulfuric acid are kept in a closed cyclic process. Pyrolysis results in the formation of ferric oxide and a major amount of γ-alumina in a satisfactory purity, with a good efficiency.

Though the process according to the invention includes some technological steps known in the art, these are combined with each other and with further, entirely new reaction steps in a specific way, which makes the utilization of low-grade, aluminium-containing mineral raw materials for producing alumina and ferric oxide possible. By the instant process alumina and ferric oxide are directly obtained in a quality, which is suitable for further manufacturing. It should further be emphasized that by the process according to the invention aluminium and iron, which mutually contaminate each other, can simultaneously be isolated in a satisfactory purity by an economic technology. This is a highly unexpected result, since none of the prior art processes could guarantee the same or similar results.

Further details of the invention are illustrated by the following, non-limiting Examples.

EXAMPLE 1

Deironization of bauxite and preparation of ferric oxide 26 tons of bauxite having a grain size of about 30 mm. are ground to a grains size of about 300 microns in a wet ball mill. Bauxite contains 50% $Al_2O_3$, 22% $Fe_2O_3$ and 6% $SiO_2$. 17 $m^3$. of water are added to the bauxite and the granulate is heated up to 65° C. in a heat exchanger. To the bauxite slurry 32.4 $m^3$. of a 34% (420 g./lit.) hydrochloric acid solution are added, and the bauxite is digested in seven stages, for 1.5 hours. During this treatment about 90% of the iron content of the starting material is dissolved, which corresponds to 5 tons of ferric oxide, i.e. about 10 tons of $FeCl_3$. To half of the volume of the digested slurry 500 g./tons of Sedosan flocculating agent are added in an amount of 500 g./tons, and the slurry is settled down in a four-stage "Dorr" sedimentator. It is then filtered through five acid-resistant cylindric filter, having an area of 20 $m^2$. each, and is washed. The $FeCl_3$ solution is evaporated to a concentration of 200 g./lit. $Fe^{3+}$ and the concentrate is decomposed at 520° C. in a pyrolysator to give 4.5 tons of $Fe_2O_3$ in a purity of about 90% and azeotropic hydrochloric acid. Hydrochloric acid is supplemented with fresh acid and is then recycled into the manufacturing process. The deironized bauxite can advantageously be processed by the Bayer method, since during its further treatment red mud is not formed.

EXAMPLE 2

Deironization of the bauxite slurry in hydrochloric acid by anion exchange

Half of the volume of digested buaxite slurry obtained in the Example 1, which contains 28 g./lit. of $Fe^{3+}$ and 220 g./lit. of hydrochloric acid in the aqueous phase, is introduced into a dialysator.

The dialysator is equipped with an anion selective cloth containing dimethanolamine groups, and the bauxite slurry containing hydrochloric acid and water are led in counter flow along the two opposite sides of the cloth. The slurry and the aqueous phase are used in a volume ratio of 1.1. Iron is dialysed from the slurry into the aqueous phase as $FeCl_3$. The pores of the cloth are clogged by the slurry, therefore, it is practically unpermeable for the aqueous phase. Hence, the $Fe^{3+}$ concentration of the bauxite slurry is decreased below 1 g./lit., while its aluminium content remains practically unchanged. The $FeCl_3$ solution obtained is converted into ferric oxide as described in Example 1.

EXAMPLE 3

The preparation of alumina suitable for preparing anhydrous $AlCl_3$ and ferric oxide from low-grade bauxite As a starting material 28 tons of low-grade bauxite containing 46% $Al_2O_3$, 15% $Fe_2O_3$ and 18.6% $SiO_2$ are used. The raw material is broken and wet milled up to a grain size of about 300 microns. The bauxite is then digested with 65 $m^3$. of a 200 g./lit. aqueous hydrochloric acid solution (azeotropic mixture). Digestion is carried out in containers (duplicators) in seven stages, for two hours. The input temperature is about 60° to 85° C. and the output temperature is about 105° to 130° C.

The bauxite slurry is settled in a Dorr sedimentator whereupon it is filtered through filter cylinders and is subsequently washed. The solution contains about 20 g./lit. of iron and about 200 g./lit. of hydrochloric acid. The solution is deironized on an ion exchange column filled with a resin Varion At 660, containing trimethylamine active moieties. The specific load of the column is 10 $m^3./m^2$.hour. When the solution leaving the column contains 2 g./lit. of $Fe^{3+}$, the ion exchange procedure is stopped and the resin is washed to iron-free with water corresponding to twice of its volume. After this regeneration the column can be used again for deironization. The eluted ferric chloride solution is evaporated to a concentration of about 1000 g./lit. of $FeCl_3$ and thereafter it is thermally decomposed to $Fe_2O_3$. The hydrochloric acid obtained during evaporation and pyrolysis is converted into concentrated hydrochloric acid in absorbers used also in the preparation of hydrochloric acid.

The filter cake contains about 13.3 t. $Al_2O_3$, 0.58 t. $Fe_2O_3$, 0.34 t. CaO and 0.16 t. MgO. To dissolve the soluble oxides a calculated amount (42 t.) concentrated sulfuric acid is added to the cake, in acid resistant autoclaves, where the substance is heated for about 30 minutes in two stages. From the slurry water is evaporated and the autothermic procedure of the aluminium sulfate formation is started, as a result of which the slurry is heated approximately up to 160° C. Before solidification the slurry is introduced into an oil-heated pipe mill, where the oxides are digested at about 400° C. and the slurry solidifies. The sulfuric acid, which is released during the heating, is distilled off and, after condensation, can be used up again.

The powdery product obtained is dissolved in 52.2 $m^3$. of water, keeping the solid to liquid ratio at about 1:2. The mixture is concentrated in Dorr evaporators and the insoluble residue, which contains silicates and titanium oxides as major components, is filtered off and washed at 70° C. The filter cake, after drying, can be used for cement production or as a titanium oxide source.

If alumina is to be prepared in a high purity, the sulfate-containing solution can be further purified by an anion exchange resin. In this case the aluminium sulfate solution, containing about 400 g./lit. of aluminium sulfate and about 12 g./lit. of ferric sulfate as impurity, is adjusted to pH 1.5 to 4 and is passed through a column filled with Varion AP (an anion exchange resin containing pyridine active groups). Under these conditions the impurities, including iron are efficiently adsorbed on the strongly basic anion exchange resin. The solution leaving the column contains at most 0.5 g./lit. of iron. The ion exchange resin can be regenerated with an aqueous sulfuric acid solution containing 100 g./lit. of sulfuric acid.

The purified, aluminium sulfate-containing solution is evaporated, dehydrated and is treated at 340° C. At this temperature the aluminium sulfate disintegrates into a white powder, which is subjected to thermal decomposition at 800° to 1000° C. 12.5 tons of a product substantially consisting of $\gamma$-alumina and about 35 tons of $SO_3$ gas are obtained. The gas is introduced into a sulfuric acid absorber and is recycled to the sulfating step.

The alumina obtained can be used for the preparation of $AlCl_3$ very well, since at a temperature of 450° to 500° C. it can be chlorinated with a practically theoretical (100%) yield.

EXAMPLE 4

Preparation of ferric oxide and alumina from red mud

The red mud used as a raw material contains 17.9% $Al_2O_3$, 34.6% $Fe_2O_3$, 5.1% $TiO_2$, 14.8% $SiO_2$, 3.8% $CaO$ and 6.2% $Na_2O$. For 1 ton of a dry red mud having the above composition 985 kg. of HCl (100%) can be calculated, and therefore, the red mud is treated with 2.35 m$^3$. of an aqueous hydrochloric acid solution, having a concentration of 420 g./lit. in an autoclave, at 130° C. for 2 hours. During this treatment 166 kg. of $Al_2O_3$ and 337 kg. of $Fe_2O_3$ are dissolved. The slurry is admixed with Varion AT resin in a ratio of 3:1, and the resin, on which iron is adsorbed, is separated from the slurry by filtration with vibration. Iron is eluted from the resin with water, the $FeCl_3$ solution is evaporated and is converted into ferric oxide by thermal decomposition. The released hydrochloric acid and the hydrochloric acid-containing solution filtered off from the deironized slurry in the presence of Sedosan flocculating agent, are subjected to fractionated evaporation. In this way an azeotropic hydrochloric acid solution is obtained, which is recycled into the deironization step. The evaporation residue, substantially consisting of $AlCl_3 \cdot 6H_2O$ is purified and can be marketed as $AlCl_3$ of "technical purity" or can be subjected to thermal decomposition in a pyrolysator, to yield $Al_2O_3$. In the whole procedure an about 8% loss in hydrochloric acid can be observed, due to the $Na_2O$ and $CaO$ content of the red mud.

The major advantages of the process according to the invention can be summarized as follows:

The invention provides a process for the utilization of low-grade aluminium and iron carriers, such as laterite and siderite-containing bauxites, or bauxites having a high silicon concentration, red mud, clays, etc. Up to the present there has been known no economic process to recover the aluminium and/or iron content of such low-grade carriers.

Starting from the above raw materials a practically silicon- and iron-free alumina can be prepared in a 80% purity. Since the product essentially consists of $\gamma$-alumina, it is very active and can be used as a starting material in chlorometallurgical processes, such as chlorination at 450° to 500° C. with a mixture of CO gas and chlorinating gas, under atmospheric pressure.

In addition to alumina, the process according to the invention yields a further product containing 90 to 99% of $Fe_2O_3$. This product is substantially free of phosphorus and sulphur, and is therefore equally suitable for metallurgical and other industrial purposes, e.g. for the production of ferromagnets, pigments, etc.

By the process of the present invention the desired products are obtained with an excellent yield (over 90%) and highly selectively.

The process, not like the Bayer process, can be accomplished without the formation of large amounts of undesirable solid and liquid waste matters.

Hydrochloric acid and sulfuric acid are used in a closed cyclic process, only the small losses should be supplemented, and the process is therefore very economic.

What we claim is:

1. A process for the preparation of alumina and ferric oxide from low-grade aluminium and iron carriers, having a high iron and silicon content, which comprises:
    (a) dissolving the iron content of a ground, mineral material in an aqueous hydrochloric acid solution containing 200 to 420 g./lit. of hydrochloric acid, at 90° to 130° C.;
    (b) eliminating the iron in the form of ferric chloride from the resulting slurry by contacting the slurry in counterflow with an anion exchange resin and eluting the resin;
    (c) adding concentrated sulfuric acid in about a stoichiometric amount calculated for the soluble oxides to the deionized slurry, heating the mixture to 140°–160° with stirring and recycling the liberated hydrochloric acid formed into the deironization step;
    (d) distilling the excess sulfuric acid at 300°–400° C. and recycling the acid;
    (e) dissolving the solid residue in water and filtering off the insoluble materials, and
    (f) evaporating the ferric chloride solution from step (b) and the aluminium sulfate solution from step (e) obtained, subjecting them to thermal decomposition at about 850° C. to produce $Fe_2O_3$ and a product substantially consisting of $\gamma$-$Al_2O_3$ and recycling the hydrochloric acid and sulfur trioxide formed.

2. A process as claimed in claim 1, which comprises using bauxites having a small module or containing laterite or siderite, red mud, colliary rocks, coal ash, clay minerals as starting materials.

3. A process as claimed in claim 1, which comprises using the mineral starting materials and hydrochloric acid solution in a 1:1 to 1:2 solid to liquid ratio.

4. A process as claimed in claim 1, which comprises eliminating iron from a ferric chloride containing slurry with a basic anion exchange resin containing trimethyl amine, dimethylethanol amine or pyridine active groups.

5. A process according to claim 1 wherein said resin is in the form of a semipermeable membrane or cloth.

* * * * *